Sept. 22, 1970  F. D. PIAZZA  3,529,821
SPACECRAFT ORBIT TRACKING TOY
Filed June 10, 1968  3 Sheets-Sheet 1

INVENTOR
Frank D. Piazza
BY Charles S. McGuire
ATTORNEY

United States Patent Office 3,529,821
Patented Sept. 22, 1970

3,529,821
SPACECRAFT ORBIT TRACKING TOY
Frank D. Piazza, 3329 Almar Drive, Vestal, N.Y. 13850
Filed June 10, 1968, Ser. No. 735,671
Int. Cl. A63f 9/00
U.S. Cl. 273—1
10 Claims

ABSTRACT OF THE DISCLOSURE

A toy or game which simulates a realistic trace of a spacecraft orbit around the earth by means of a moving array of sequentially blinking lights mounted behind a map. The lights are mounted in a line on a vertically reciprocal element, which is driven by a motor. Various controls may be provided for changing the trajectory of the trace of the simulated craft, by changing the rate of sequential blinking of the lights and the speed of the motor thereby enabling the device to simulate the performance of deorbit and splashdown maneuvers and other simulated "mission" procedures just as in real spacecraft.

---

The present invention relates to a toy or game for both amusement and educational value. More specifically, the invention concerns a toy which includes an array of lights movable with respect to a map in such a way as to realistically trace a spacecraft orbit which may be controlled by the operator.

The toy presents, in simplified form, the trace of an orbital space vehicle such as those presently in actual use during launch, orbit, reentry and landing. In order to trace the vehicles position relative to the earth's surface, a map such as a Mercator projection chart is supported in convenient viewing position. The space vehicle position at any given time is represented by lighting one of a movable array of small bulbs arranged behind the map. A variety of controls may be provided for simulating various "mission procedures." For example, by operating a particular switch at the beginning of operation a particular light, e.g. the one represented as being at the same latitude and longitude as Cape Kennedy, Fla., comes on and remains lit until launching.

During orbit the trace of the vehicle is simulated by sequentially pulsing the array of lights in one direction across the map while moving it in another.

In actual space vehicles, orbit is controlled by increasing or decreasing velocity by thrusting (burning fuel) in proper direction, as in jet aircraft. Appropriate means may be provided in the present invention to control the relative velocities of pulsing and movement of the lights, thereby providing a realistic control of the orbital trace across the map. Controls for deorbit and landing or "splashdown" may include variable timing means operable to stop pulsing and movement of the lights after a run-down period with the last lighting element remaining lit to indicate the point of landing. A marker may be placed on the map to indicate a designated landing area; in order to make the light which indicates the landing point come within the designated area the operator must properly adjust the orbit and estimate the future trajectory and time required for run-down of the timing means. Game rules may be devised in connection with employment of the invention, which may include awarding points for "landing" the spacecraft in the designated area, a lesser number of points for near-miss areas, etc.

It is a principal object of the invention to provide apparatus in the nature of a toy or game which gives a realistic indication of the trajectory of a spacecraft in orbit and includes controls which allow the operator to perform a simulated launch, control in orbit and landing of the spacecraft.

A further object is to provide a game geared to the spaceage wherein certain "mission procedures" may be carried out by the players and points awarded on the basis of proficiency therein.

Still another object is to provide a game or toy operable in a variety of modes by manipulation of electrical switches and the like to offer educational value in the field of orbiting space vehicles.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
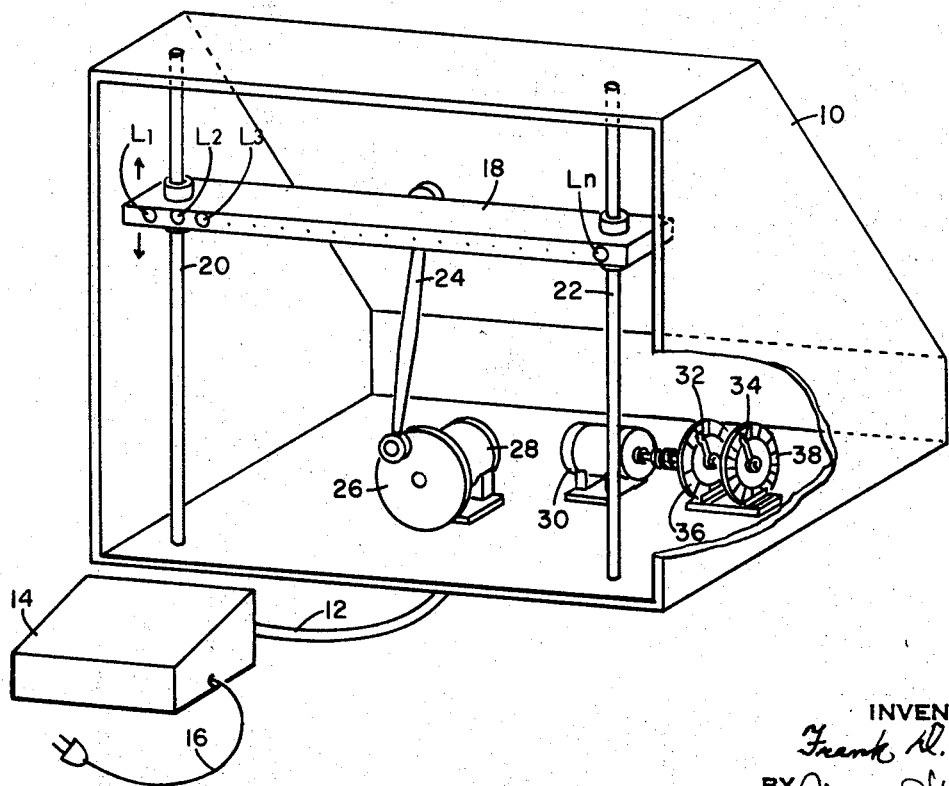
FIG. 1 is a perspective view showing the general constructional details of one embodiment of the invention.

Referring now to the drawings, in FIG. 1 is shown a first housing 10 with its front wall removed in order to show the elements contained therein. The size and shape of housing 10 is a matter of choice and convenience, as are the constructional materials with the provision that the front wall must be transparent or, preferably, transluscent as will later become apparent. Housing 10 is electrically connected, by suitable wiring 12, to second housing 14, from which extends electrical cord 16 for attachment to a suitable source of electric power such as a conventional 110 V. AC circuit.

Housing 10 contains an array of lighting elements, $L_1$, $L_2$, $L_3$ ... $L_n$ arranged in a horizontal line on a common support 18. The lighting elements preferably comprise small incandescent bulbs, such as pen lights, capable of a relatively large number of brief on-off cycles before failure. Spacing of the bulbs is optional, a prefered example being about one to two inches, representing a spacing on the map of one bulb to each 10° of longitude. The bulbs are held in suitably wired sockets and receive power in a manner described hereinafter.

Support 18 is slidably mounted for reciprocal vertical movement on fixed guides 20 and 22 and is mechanically linked by a suitable crank, rod 24 and disc 26, or other such simple mechanism, to electric motor 28 which is constructed and arranged to impart about one r.p.m. to disc 26. A second electric motor 30 is provided within housing 10 and drives wiper arms 32 and 34 across the contacts on wafer switches 36 and 38, respectively. The contacts on the wafer switches are each connected to one of the light bulbs and, as will be explained later in more detail, may be connected to the power source so that rotation of the wiper arms around the wafer switches results in the light being sequentially pulsed from left to right.

Figure 2:
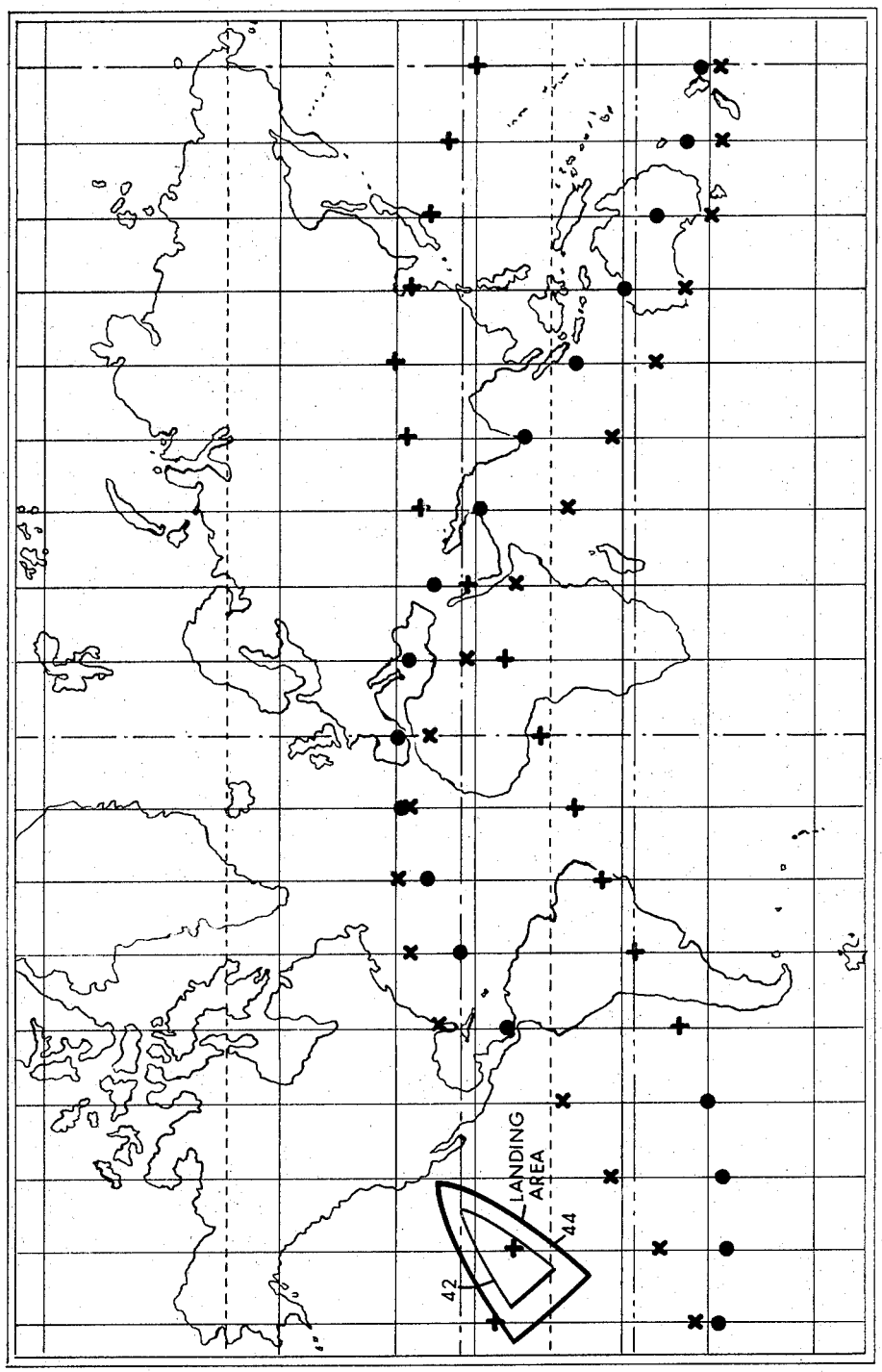
FIG. 2 is a Mercator chart showing representative orbital projections such as could be produced by the apparatus of FIG. 1.

Turning now to FIG. 2 there is shown a Mercator map 40 of the world which, held on a suitable support, forms the front wall of housing 10. The map and support are made of such materials that the light from bulbs $I_1$–$L_m$ is visible therethrough. From the foregoing description it is apparent that if the lights are pulsed in sequence at a rate properly synchronized with movement of support 18 up and down, a sine wave representing a realistic spacecraft trajectory over the earth will be traced. Means are provided, as fully explained later herein, for causing a particular one of the bulbs to light first and to move up or down to a particular point on the map prior to beginning the sequencing of the lights, i.e., the simulated launch of the spacecraft. For example, the launch may take place at the point on the map corresponding to Cape Kennedy, Fla. and the first orbit proceeds along the path marked with X's to indicate the position of the bulbs at the time of pulsing. The second orbit follows the path marked with O's, proceeding at the same rate as the first orbit until reaching about 120° east lognitude, at which time motor 28 is caused to run slower while motor 30 continues to run at the same speed. This results in a change in orbit equivalent to a reduction in velocity of the simulated spacecraft, and the third orbit follows the path marked by +'s.

As previously stated, one of the objects of the game may be to "land the spacecraft," i.e. to cause the motors to stop, when the last bulb is within a specified landing area. To this end, timing means are provided for actuation by the operator to switch off the power to motors 28 and 30 after a run-down period, with the last bulb remaining on in a stationary position. On map 40 is indicated an ogive-shaped primary landing area 42 concentrically surrounded by a somewhat larger secondary landing area 44. The outlines of the designated landing areas may be permanently marked on the map or, preferably, may comprise movable elements which adhere to the map surface, or be eraseably marked on the map surface in any desired location prior to the launch.

Figure 4:
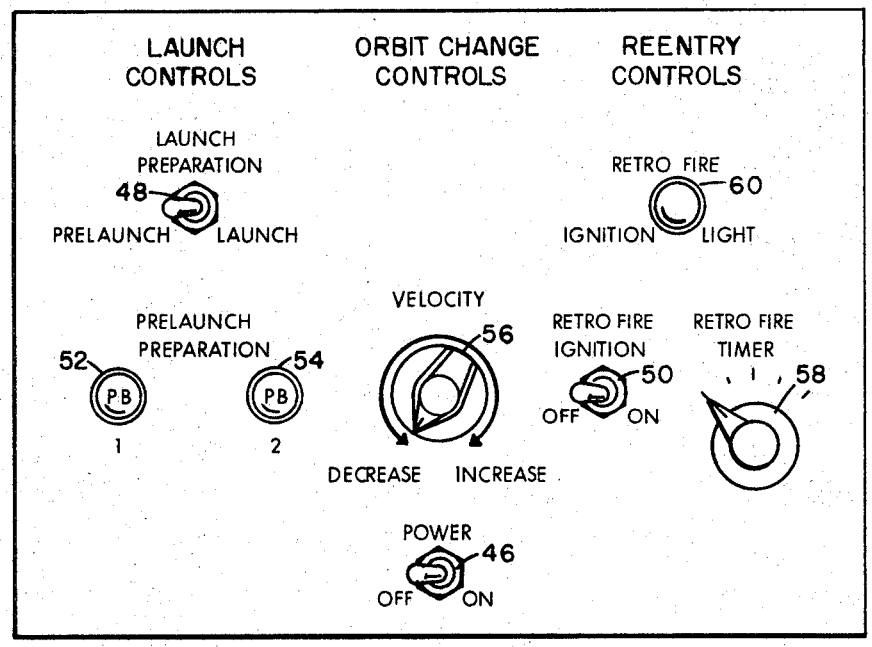
FIG. 4 is a plan view of a suggested control panel face for operating the circuit elements of FIG. 3.

The electrical implementation of the operation described above, shown schematically in FIG. 3, and the operator controls used to effect such operation, a suggested physical embodiment of which is shown in FIG. 4, will now be described in detail. On the face of control box 14 are provided three toggle switches indicated as power switch 46, launch preparation switch 48, and retrofire ignition switch 50. Switch 46 is provided in the line between the apparatus and the power supply to which it is connected, and is indicated schematically in FIG. 3 by the reference numeral 46'. Switch 48 is a double throw, triple pole switch the poles of which are shown connected by a dotted line to indicate their common movement, and are denoted respectively by the numerals 48'a, 48'b and 48'c. A pair of prelaunch preparation pushbuttons 52 and 54 are provided on control panel 14; these are numbered 52' and 54', respectively, in the schematic diagram. The remaining controls on panel 14 are orbit change control knob 56, retrofire timer 58, and retrofire ignition light 60.

Figure 3:
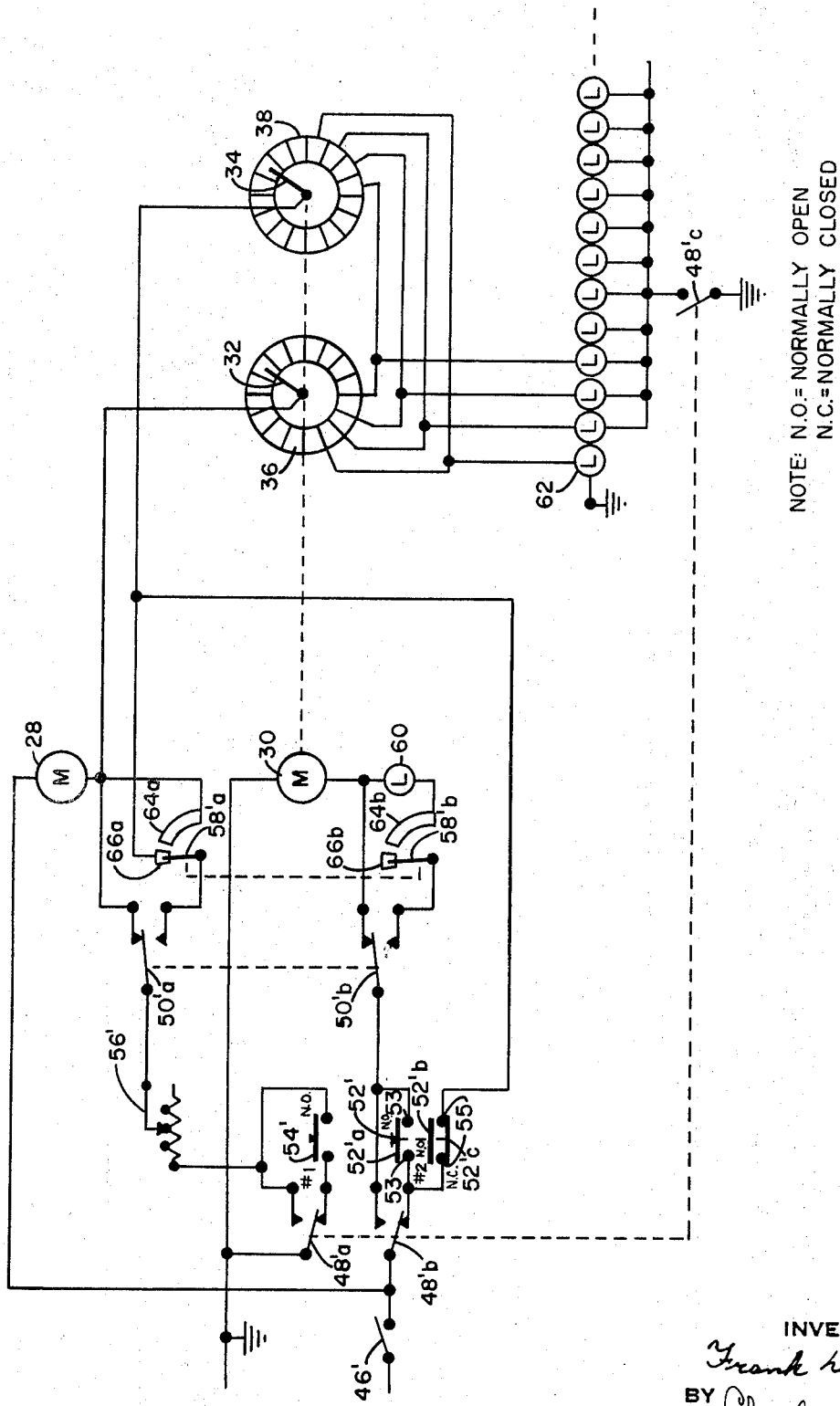
FIG. 3 is an electrical schematic showing one form of appropriate circuitry for implementing the invention.

Before connecting cord 16 to an AC outlet, power switch 46 must be in the "off" position, opening the circuit between the power supply and the apparatus, launch preparation switch 48 is set to the "prelaunch" position, and retrofire ignition switch 50 is set to the "off" position, i.e., in the positions shown in FIG. 3. After the switches have been so set, and the apparatus is connected to an appropriate power supply, switch 46 is moved to the "on" position and prelaunch preparation pushbutton 52 is depressed. This causes arms 52'a and 52'b to close the circuit across contacts 53 and 55, respectively. Since switch 46' is "on," switch 48'b is at "prelaunch," and switch 50' is "off," the circuit through contacts 53 supplies power to motor 30, thereby moving wiper arms 32 and 34 across the contacts on wafer switches 36 and 38. The circuit through contacts 55 supplies power to one side of the lamp circuits through wiper arm 34 and wide contact wafer switch 38, but since switch 48'c is open only bulb 62 is connected to ground. Thus, motor 30 rotates until wiper arm 34 reaches the contact connected to bulb 62, causing the bulb to light, at which time the operator releases pushbutton 52. This opens the circuit across contacts 53, thereby stopping motor 30, but arm 52'c closes the circuit across contacts 55 so that bulb 62 remains lit. Bulb 62, of course, is located adjacent the longitude on map 40 at which the launch is to commence, e.g., the longitude of Cape Kennedy, Fla.

Since bar 18 may be in any vertical position at the outset, bulb 62 must be moved to the proper latitude in order to appear directly adjacent Cape Kennedy on the map. This is accomplished by depressing pushbutton 54, thereby causing arm 54'a to close the circuit across contacts 57 and supply power to motor 28. As motor 28 rotates, bar 18 is moved vertically until it is observed that bulb 62 is aligned with Cape Kennedy, at which time the operator releases pushbutton 54, thereby stopping motor 30 with bulb 62 still lit and in the proper position to begin the launch. If the orbit is to progress initially upward in an easterly direction from Cape Kennedy, as in actual launches, pushbutton 54 must be released as bar 18 is moving upward; if the bar is initially moving downward, as evidenced by the visible path of bulb 62, the operator keeps the button depressed until the bar moves all the way to the bottom and back up again.

Switch 48 is now moved from the "prelaunch" to the "launch" position. This immediately connects all of the bulbs on bar 18 to ground through pole 48'c of switch 48, and supplies power to both motors 28 and 30 through poles 48'a and 48'b, respectively. Thus, bar 18 will move vertically up and down as previously described and wiper arms 32 and 34 will be moved across the contacts of narrow contact wafer switch 36 and wide contact wafer switch 38, respectively. Since wiper arm 34 is now open-circuited, the bulbs will not receive power through the wide contact switch, but wiper arm 32 is connected to the circuit of motor 28 and will therefore supply power to the bulbs sequentially, in short pulses, as the arm moves across the narrow contacts of wafer switch 36. The pulsing of the bulbs in sequence as bar 18 moves up and down produces the orbital trace across map 40 as previously described.

During orbit the trace may be altered by changing the speed of motor 28, which is the simulated equivalent of increasing or decreasing the velocity of the spacecraft, as stated earlier. Means for effecting changes in motor speed, within desired limits, may take any convenient form previously known in the art including both electrical means, for altering either the amplitude or frequency of power supplied to the motor, and mechanical means, such as gear reductions or mechanical loads. In the illustrated embodiment an electrical control is provided in the form of knob 56 on control panel 14 which is linked to a common potentiometer, shown schematically in FIG. 3 and numbered 56'. Although the voltage to motor 28 may be varied in a continuous manner by potentiometer 56', it is preferred that a series of contacts be provided, as indicated in the drawing, to cause step-wise variations in velocity. This adds more challenge to the task of adjusting the orbit and is more in conformity with actual conditions where a thrust is applied to the spacecraft and the orbital path reevaluated to determine whether it conforms to the desired change.

In order to accomplish a "reentry and splashdown" the speed is adjusted so that the estimated path of the spacecraft will bring it over the designated landing area. Prior to this time, of course, assigned "mission procedures" may be carried out during the spacecrafts flight. To accomplish a reentry the spacecraft must thrust for a relatively long period of time to reduce its velocity so that it will enter the atmosphere so that the added frictional deceleration and gravitational force will bring it back to earth.

Variable timer means are provided so that the operator may set the estimated length of burn required of the spacecraft engine in order to bring the craft down in the selected landing area. In the illustrated embodiment, retrofire timer 58 is connected, through an air dashpot, spring driven gear arrangement, or other such conventional means, to a pair of wiper arms 58'a and 58'b. The manual setting of the retrofire timer moves the two wiper arms in a clockwise direction, as shown in FIG. 3, across contacts 64a and 64b, and they are biased to run down counterclockwise until coming to rest against stops in contact with contacts 66a and 66b.

As soon as the operator has set retrofire timer 58 to the desired position he immediately throws retrofire ignition switch 50 from the "off" to the "on" position. This is a double pole switch and changes the power supply to the two motors to be connected through the wiper arms of the timer. Also, retrofire ignition light 60, shown in both FIGS. 3 and 4, will receive current through pole 50'b of switch 50 and wiper arm 58'b to indicate that reentry is in progress. When the timer has run down, the power to both motors is cut off simultaneously, thus stopping both movement of bar 18 and sequential pulsing of the bulbs. It will be noted, however, that contact 66a, upon which wiper arm 58'a rests after rundown of the timer, is connected to wide contact wafer switch 38. Since wiper arm 34 is always in contact with one of the wide contacts on this switch, one of the bulbs will remain lit to indicate the point of splashdown on the map. Wiper arms 32 and 34 are moved so as to be in contact, through their respective wafer switches, with the same bulb. Therefore, the bulb which remains on after motors 28 and 30 have stopped is the same bulb which was last momentarily pulsed in sequence through wiper arm 32 and narrow contact switch 36. The bulb indicating the point of splashdown will remain on until switch 46 is moved to the "off" position, as must be done before preparation for another launch.

It will be readily apparent that the disclosed embodiment of the invention is subject to a wide variety of modifications. For example, the retrofire timer could be connected to the motor speed control in order to effect a continuous change in spacecraft velocity from the beginning of retrofire until splashdown. Also, any number of switches, panel lights, etc. could be added to make the game or toy more elaborate.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

What is claimed is:

1. A spacecraft orbit tracking toy comprising, in combination:
    (a) a substantially planar map of the portion of a planetary surface to be orbited;
    (b) a linear array of lighting elements arranged behind the viewing surface of said map;
    (c) first motor means for vertically reciprocally moving said array of lighting elements in a direction perpendicular to said linear array;
    (d) second motor means for sequentially pulsing said lighting elements in order along said linear array;
    (e) said map and lighting elements being so constructed and arranged that the light produced by pulsing said lighting elements is visible through said map; and
    (f) means for so controlling the relative speeds of said first and second motor means that the pulses of light produce a realistic spacecraft orbit trace with respect to said map.

2. The invention according to claim 1 wherein said lighting elements are arranged horizontally and further means are provided for lighting a predetermined one of said elements prior to activating said second motor means while moving said array of elements vertically until said one element is aligned with a selected point on said map.

3. The invention according to claim 1 and further comprising timing means operable to deactivate both said first and second motor means upon terminating of a selectively variable run-down period of said timing means.

4. The invention according to claim 3 and further including means causing the last of said lighting elements to be lit during operation of said second motor means, to remain lit upon deactivation thereof.

5. The invention according to claim 1 and further including means for selectively varying the speed of said first motor relative to that of said second motor means during operation of each, thereby changing the apparent trace of the orbit.

6. The invention according to claim 5 wherein said means for relatively varying the speed of said first and second motor means comprises variable resistor means in the circuit of said first motor means.

7. The invention according to claim 5 wherein said means for relatively varying the speed of said first and second motor means comprises means for effecting such variation in discrete steps.

8. The invention according to claim 1 wherein said planar map comprises a Mercator projection of the earth.

9. The invention according to claim 8 wherein said linear array of lighting elements comprises a row of individual incandescent bulbs arranged on a support which is mechanically connected to said first motor means.

10. The invention according to claim 9 wherein said second motor means drives a wiper arm through sequential electrical contact between each of said individual bulbs and a suitable power supply.

References Cited

UNITED STATES PATENTS

| | | | |
|---|---|---|---|
| 2,300,132 | 10/1942 | New | 273—101.2 |
| 3,012,368 | 12/1961 | Freidman. | |
| 3,012,779 | 12/1961 | Freidman. | |
| 3,046,676 | 7/1962 | Hermann et al. | |
| 3,269,751 | 8/1966 | Koci et al. | 40—106.52 XR |

RICHARD C. PINKHAM, Primary Examiner

P. E. SHAPIRO, Assistant Examiner

U.S. Cl. X.R.

35—12, 22; 40—106.52; 46—226